US008963770B2

(12) United States Patent  (10) Patent No.: US 8,963,770 B2
Smely et al.  (45) Date of Patent: *Feb. 24, 2015

(54) METHOD AND DEVICE FOR DETERMINING THE DISTANCE BETWEEN A RADIO BEACON AND AN ONBOARD UNIT

(75) Inventors: Dieter Smely, Schwechat (AT); Josef Winkler, Baden (AT); Oliver Nagy, Vienna (AT); Alexander Paier, Vienna (AT); Robert Povolny, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 220 days.
This patent is subject to a terminal disclaimer.

(21) Appl. No.: 13/701,489

(22) PCT Filed: Nov. 29, 2011

(86) PCT No.: PCT/AT2011/000480
§ 371 (c)(1),
(2), (4) Date: Nov. 30, 2012

(87) PCT Pub. No.: WO2012/075515
PCT Pub. Date: Jun. 14, 2012

(65) Prior Publication Data
US 2013/0069829 A1  Mar. 21, 2013

(30) Foreign Application Priority Data
Dec. 7, 2010 (EP) .................................... 10450189

(51) Int. Cl.
*G01S 11/10* (2006.01)
*G07B 15/06* (2011.01)
*G08G 1/015* (2006.01)
*G01S 11/02* (2010.01)
*H04W 4/02* (2009.01)
*G08G 1/01* (2006.01)

(52) U.S. Cl.
CPC ............... *G01S 11/10* (2013.01); *G01S 11/026* (2013.01); *G08G 1/01* (2013.01); *G07B 15/063* (2013.01); *G08G 1/015* (2013.01); *H04W 4/023* (2013.01)
USPC ............ 342/125; 342/118; 342/128; 340/928

(58) Field of Classification Search
CPC ....... G01S 11/10; G01S 11/026; G07B 15/063; G08G 1/015; G08G 1/01; H04W 4/023
USPC ........................................................ 342/118
See application file for complete search history.

(56) References Cited

U.S. PATENT DOCUMENTS

| 3,006,074 A | 10/1961 | Heller |
| 3,195,136 A | 7/1965 | Klein |

(Continued)

FOREIGN PATENT DOCUMENTS

| CN | 1555495 A | 12/2004 |
| CN | 102933979 A | 2/2013 |
| GB | 2 376 585 B | 3/2005 |

OTHER PUBLICATIONS

Search report issued on Jan. 25, 2013 in corresponding Singapore Application No. 201109026-3, 18pp.

(Continued)

*Primary Examiner* — Matthew M Barker
(74) *Attorney, Agent, or Firm* — Fiala & Weaver P.L.L.C.

(57) ABSTRACT

The invention relates to a method for determining the distance between a radio beacon and a vehicle device passing in front of said radio beacon, in a road toll system. A signal of a frequency having a known temporal profile is emitted. Said method consists of the following steps: the signal is captured in the other component when passing and the temporal profile of the frequency is recorded in relation to the known temporal profile; a modification in the recorded frequency profile exceeding a first threshold value is detected; two distant wave zones in the frequency profile, lying temporally in front of and behind the detected modification, which displays a frequency modification below a second threshold value, are searched for; the recorded frequency profile is scaled in such a manner that the distance wave zones take the predetermined values; and said distance "a" from the scaled frequency path is determined. The invention also relates to radio beacons, installations and vehicle devices for implementing the method.

40 Claims, 9 Drawing Sheets

(56) References Cited

U.S. PATENT DOCUMENTS

| | | |
|---|---|---|
| 5,790,052 A | 8/1998 | Grabow |
| 5,863,120 A | 1/1999 | Gallagher et al. |
| 7,593,711 B2 | 9/2009 | Romano et al. |
| 8,566,148 B2 | 10/2013 | Karner |
| 2009/0102718 A1 | 4/2009 | Karlsson |
| 2009/0303004 A1 | 12/2009 | Tuttle |

OTHER PUBLICATIONS

International Written Opinion of corresponding PCT/AT2011/000479, 6 pp.
International Search Report of corresponding PCT/AT2011/000480, dated Feb. 9, 2012, 6 pages.
International Written Opinion of corresponding PCT/AT2011/000480, 6 pages.
EP Search Report of corresponding EP 10450189.5, dated Mar. 16, 2011, 4 pages.
International Search Report of PCT/AT2011/000479, dated Feb. 23, 2012, 5 pages.
NZ Office Action of NZ 595895, dated Oct. 27, 2011, 2 pages.
Office Action received for Chinese Patent Application No. 201180026112.9, mailed on Aug. 14, 2014, 4 pages.
Office Action received for Chilean Patent Application No. 2011-003093, mailed on Oct. 30, 2013, 7 pages.
Office Action received for Chilean Patent Application No. 2011-003093, mailed on Jul. 27, 2014, 8 pages.
Chilean Application No. 0244-1998, filed 1998, 47 pages.
Chilean Application No. 1178-2006, filed May 18, 2006, 79 pages.
Chilean Application No. 622-2004, filed Mar. 24, 2004, 24 pages.

METHOD AND DEVICE FOR DETERMINING THE DISTANCE BETWEEN A RADIO BEACON AND AN ONBOARD UNIT

CROSS-REFERENCE TO RELATED APPLICATION(S)

This application is a National Phase patent application and claims priority to and benefit of international Application Number PCT/AT2011/000480, filed on Nov. 29, 2011, which claims priority to and the benefit of European Patent Application No. 10450189.5, filed on Dec. 7, 2010, the entire disclosures of which are incorporated herein by reference.

FIELD OF THE INVENTION

The present invention relates to a method for determining the distance between a radio beacon and an onboard unit passing it in a road toll system, wherein at least one of the two components, the radio beacon and the onboard unit, emits a signal with a known curve of its frequency over time. The invention additionally relates to a radio beacon, an assembly and an onboard unit for implementing such a method.

BACKGROUND

In radio beacon-based road toll systems, e.g. according to the dedicated short-range communication (DSRC), wireless access in a vehicle environment (WAVE) or intelligent transport systems generation 5 (ITS-G5) standard of standards institutes CEN or ETSI, onboard units (OBUs) carried by the vehicles communicate with geographically distributed radio beacons via short-range radio transmission as soon as they pass these. The radio communication generally serves to locate the vehicle on the radio coverage area of the radio beacon in order to charge for usage of locations or to transmit toll data generated by the OBU to radio beacons on its route.

It is often desirable to determine the distance at which a vehicle passes a radio beacon, e.g. to penalise toll violations in the case of multi-lane roads. When multiple vehicles travelling next to one another in different lanes pass the radio beacon and one of the beacon's radio communications indicates a toll violation, e.g. a missed toll charge debit, an inadequate balance of a charge account, a defective or incorrectly adjusted OBU etc., or a lane-dependent charge rate or toll (multiple occupant lane) needs to be calculated. Accordingly, it is essential to know which of the vehicles travelling next to one another is responsible to be able to identify this violation e.g. visually in situ or on an evidence photo of the road section of the beacon.

Various methods of determining the distance are currently known. One solution is to use multiple physically offset receiving antennae in the radio beacon to determine the positions of the OBUs in the radio receiving field from phase difference measurements between the OBU signals received by the individual antennae. Another solution is known from the U.S. Pat. No. 5,790,052 and is based on Doppler measurements of the different relative speeds of an OBU relation to physically offset receiving antennae of a radio beacon to determine the ratio of the distances from the two receiving antennae from the ratio of the speed measured values. Finally, it would also be possible to use a separate radio beacon with a low radio coverage range for each lane. All these known solutions are expensive, because they are based on multiple receiving antennae.

SUMMARY

The present invention provides methods and devices for determining the distance between an OBU and a radio beacon in a road toll system, which requires lower equipment expenditure for conversion than the known solutions.

In some embodiments, the invention is a method for determining the distance between an OBU and a radio beacon in a read toll system. The method includes: receiving the signal by the other of the radio beacon and the onboard unit during the passing and recording the curve of its frequency over time in relation to the known curve over time; detecting a change in the recorded frequency curve exceeding a first threshold value; determining two far regions in the frequency curve lying before and after the detected change in time that show a frequency change below a second threshold value; scaling the recorded frequency curve in such a manner that the far regions assume predetermined values; and determining said distance from the scaled frequency curve.

In some embodiments, the invention also provides a radio beacon for a road toll system for determining the distance of a vehicle passing the radio beacon, and equipped with an onboard unit, which emits a signal with a known curve of its frequency over time. The radio beacon includes: a receiver configured to receive the signal from the vehicle; a memory connected to the receiver, which is configured to record the curve of the frequency of the received signal over time in relation to the known curve over time; a detector electrically coupled to the memory and configured to detect a change in the recorded frequency curve; a first evaluation device electrically coupled to the detector and the memory and configured to determine two far regions in the frequency curve lying before and after the detected change in time that show a frequency change below a threshold value; a scaling device electrically coupled to the memory and the first evaluation device and configured to scale the recorded frequency curve in such a manner that the far regions assume predetermined values; and a second evaluation device electrically coupled to the scaling device configured to determine the distance from the scaled frequency curve.

The radio beacon can be arranged to be fixed on a road or be mobile, e.g. mounted on a control vehicle of the road toll system.

In some embodiments, the invention is an assembly for determining the road lane, on which a passing vehicle with an onboard unit is moving. The assembly includes: at least two radio beacons of the type proposed here, which lie approximately at the same level at a distance from one another in a normal plane to the road longitudinal direction and respectively determine their distance from the onboard unit, and a third evaluation device electrically coupled to the radio beacons for receiving said determined distances, selecting the shortest distance from said determined distances and determining the road lane therefrom.

The assembly according to the invention is based on the knowledge that the accuracy of the distance determined by Doppler jump analysis is higher for the smaller distances than for the larger distances, so long as this is not so small that the time resolution for the correct capture of the frequency curve in the jump region of interest is no longer sufficient.

If mobile radio beacons mounted on a control vehicle are used, the two radio beacons of the assembly can be mounted on each side of the control vehicle, so that they are at a distance from one another and can clearly identify vehicles passing on both sides of the control vehicle because of their different distances from the two radio beacons.

In some embodiments, the invention is an assembly for determining the road lane of a passing vehicle with an onboard unit on a multi-lane road. The assembly includes: at least two radio beacons of the type proposed here, which lie in a normal plane to the road longitudinal direction at a distance from one another and respectively determine their distance from the onboard unit, and a third evaluation device electrically coupled to the radio beacons for receiving said determined distances and determining the road lane by triangulation from the position of the radio beacons, their distance from one another and the determined distances.

With an assembly of this type, for example, radio beacons arranged above the road on a bridge girder spanning the road, can also be used and the respective road lane can be determined by triangulation from the determined distances.

In some embodiments, the invention is an onboard unit (OBU) for a road toll system for determining the distance from a radio beacon of the road toll system. The radio beacon emits a signal with a known curve of its frequency over time, which is distinguished by a receiver configured to receive the signal of the radio beacon. The OBU includes: a receiver configured to receive the signal from the radio beacon; a memory electrically coupled to the receiver configured to record the curve of the frequency of the received signal over time in relation to the known curve over time; a detector electrically coupled to the memory and configured to detect a change in the recorded frequency curve; a first evaluation device electrically coupled to the detector and the memory configured to determine two far regions in the frequency curve lying before and after the detected change in time that show a frequency change below a threshold value; a scaling device electrically coupled to the memory and the first evaluation device and configured to scale the recorded frequency curve in such a manner that the far regions assume predetermined values; and a second evaluation device electrically coupled to the scaling device configured to determine the distance from the scaled frequency curve.

With respect to further features and advantages of the radio beacon, assembly and onboard unit according to the invention, reference is made to the above statements regarding the method.

BRIEF DESCRIPTION OF THE DRAWINGS

The invention shall be explained in more detail below on the basis of exemplary embodiments with reference to the accompanying drawings.

DETAILED DESCRIPTION

The present invention makes use of the circumstance that at the time of direct passage the Doppler-related frequency change of the radio beacon or OBU signal is inversely proportional to the normal distance between the radio beacon and the OBU, when the distance is minimal, so long as the frequency curve is normalised to the relative speed between the beacon and the vehicle. The latter is achieved by evaluating the frequency curve in "far regions", that is, in these far regions, the distance of the components from one another compared to the normal distance is very large and this is negligible, and therefore the extent of the Doppler shift there depends substantially only on the inherent speed and this can be determined therefrom. Further, the dependence on the normal distance, and therefore this itself, can be determined from the analysis of the frequency curve compensated by the inherent speed in the near region of the beacon where the greatest change ("Doppler jump") of the frequency curve occurs. As a result, the passing distance can be determined alone from the radio communication between the OBU and the radio beacon with a single receiver and a single antenna.

The scaled frequency curve can be evaluated in the near range by signal analysis in a wide variety of ways. According to some embodiments of the invention, the distance is determined from the gradient of the scaled frequency curve in an inflection point thereof. The gradient in the inflection point is inversely proportional to the passing distance and can be simply determined, for example, by differentiation.

According to some embodiments of the invention the distance is determined from a frequency value of the scaled frequency curve lying between an inflection point of the scaled frequency curve and a far region. At such a point, which lies both at a distance from the inflection point and at a distance from the far regions, the frequency value of the scaled frequency curve is itself a significant dimension for the distance: the higher the frequency value, the shorter the passing distance, and vice versa. This criterion renders a differentiation of the frequency curve unnecessary; however, since the proportionality is non-linear, a conversion table is generally of advantage for determining the passing distance.

In some embodiments, the distance is determined from an integral of the scaled frequency curve over a section lying between an inflection point thereof and a far region. The integral of the scaled frequency curve is also a significant criterion for the passing distance. Thus, the frequency values of the scaled frequency curve can be integrated, e.g., between the inflection point and one of the far regions, and the integral ("area under the curve") is a non-linear dimension for the passing distance. That is, the higher the integral, the shorter the passing distance, and vice versa. In some embodiments, a table issued for conversion of the non-linear proportionality between the integral and the passing distance is of advantage.

The method of the invention can be performed in both directions between radio beacon and OBU, i.e. both in the OBU on the basis of an evaluation of a signal of the radio beacon, and in the radio beacon on the basis of an evaluation of a signal of the OBU, or in both components simultaneously. Hence, in some embodiments of the invention, the signal is emitted by the radio beacon and received by the onboard unit, wherein the steps of recording, detecting, searching, scaling and determining are conducted by the onboard unit, as a result of which an onboard unit can determine its passing distance from a radio beacon.

The signal emitted by the radio beacon does not necessarily have to be emitted continuously, but it can also be emitted intermittently and the frequency curve is processed in a time-discrete manner for time points, at which the signal is received. As a result, time-discrete scan values of the frequency curve can be determined. Then, if there are sufficient scan values at sufficiently short time intervals, the distance can be determined therefrom with sufficient accuracy.

The above embodiment is particularly suitable for the application case where the signal is formed by a repeated request signal of the radio beacon, which prompts passing onboard units to respond. If for example, the road toll system operates according to the CEN-DSRC or WAVE or ITS-G5 standard and accordingly the radio beacon has a CEN-DSRC, WAVE or ITS-G5 transceiver, the said intermittent signal can be a Beacon Service Table (BST) message emitted periodically by the radio beacon according to the CEN-DSRC standard or a WAVE Service Announcement (VISA) according to the WAVE or ITS-G5 standard.

In some embodiments the repetition rate of the request signal is adaptively matched to an at least approximate measured value of the distance between the radio beacon and the onboard unit. As a result, a higher time resolution and therefore number of scan values of the frequency curves can be obtained in the vicinity of the Doppler jump of interest, which increases the accuracy of the distance determination.

In a particularly preferred manner, the distance between the radio beacon and the onboard unit can be determined approximately from the received signal strength of the response signal of the onboard unit received in the radio beacon, which renders a separate distance measurement sensor unnecessary.

In some embodiments, the method can be performed in the radio beacon to determine the distance of passing onboard units by the signal being emitted by the onboard unit and received by the radio beacon, wherein the steps of recording, detecting, searching, scaling and determining are conducted by the radio beacon.

In some embodiments, the signal likewise does not necessarily have to be present continuously, but can be emitted intermittently and the frequency curve can be processed in a time-discrete manner for time points, at which the signal is received. For example, the signal can be formed by a sequence of response signals of the onboard unit, which are respectively given as response to a repeated request signal of the radio beacon. In the CEN-DSRC and WAVE or ITS-G5 standards such repeated request signals of the radio beacon can be BST or WSA messages or also mere "echo" messages, which are emitted by a radio beacon to prompt an onboard unit to merely repeat a message, e.g. for test purposes.

Likewise, the repetition rate of the request signal can be adaptively matched to an at least approximate measured value of the distance between the radio beacon and the onboard unit, which increases the accuracy of the determination of the gradient in the inflection point and thus the distance determination. In some embodiments, the received signal strength of the signal of the onboard unit received in the radio beacon and evaluated for the distance determination is directly used for the approximate distance determination, so that no separate distance measurement sensor is necessary thr this purpose.

In some embodiments, both the radio beacon and the onboard unit can respectively determine their distances from the respective other components in the outlined manner. At least one of the components, the radio beacon and the onboard unit, may transmit the distance it has determined to the other of the two components, which compares the received distance with the distance it has itself determined for checking purposes.

The road lane of a multi-lane road, in which the vehicle is moving, may then be determined from the distance. As a result, toll violations can be matched unequivocally to a road lane and the vehicle(s) located therein in the case of parallel passing vehicles.

If the road lane determination occurs in the onboard unit, e.g. to calculate a road lane-dependent toll, then the road lane information can also be transmitted from the onboard unit to the radio beacon and the road lane information can be cross-checked by radio beacon against a distance it has itself determined or against a road lane it has itself determined. In this case, the distance determination of the radio beacon can be conducted both in a conventional manner, e.g. by means of conventional distance measurement sensors, or in the manner presented here. The distance determination may be performed in the radio beacon with lower accuracy than in the onboard unit, particularly with reduced scanning rates, since this is sufficient for checking purposes. The reverse case is also possible and can be beneficial if, for example, the distance determination can be conducted more precisely in the radio beacon than with cost-optimised components in the onboard unit, which have a lower computing power.

The Doppler shift evaluated with the method of the invention can be measured at any desired frequency of the signal, whether it is a carrier frequency or preferably a modulation frequency thereof. Modulation frequency is understood to be a frequency of any desired modulation of the OBU signal, whether it is a simple frequency or amplitude modulation, one of the modulation frequencies of an OFDM modulation, or also a pulse or burst modulation such as occurs as a result of periodic transfers of entire data blocks; such a block repetition rate can also be regarded as a modulation frequency, the Doppler frequency shift of which can be measured.

The method of the invention is suitable for all types of radio beacon-based road toll systems. The method is particularly suitable for CEN-DSRC and WAVE or ITS-G5 road toll systems, in which a CEN-DSRC or WAVE or ITS-G5 transmitter of the onboard unit is used to emit the signal. Other configurations using RFID technology, or also any cellular (e.g. GSM, UMTS, LTE) and near-range radio technologies (e.g. Bluetooth, WLAN), are also possible.

Figure 1:
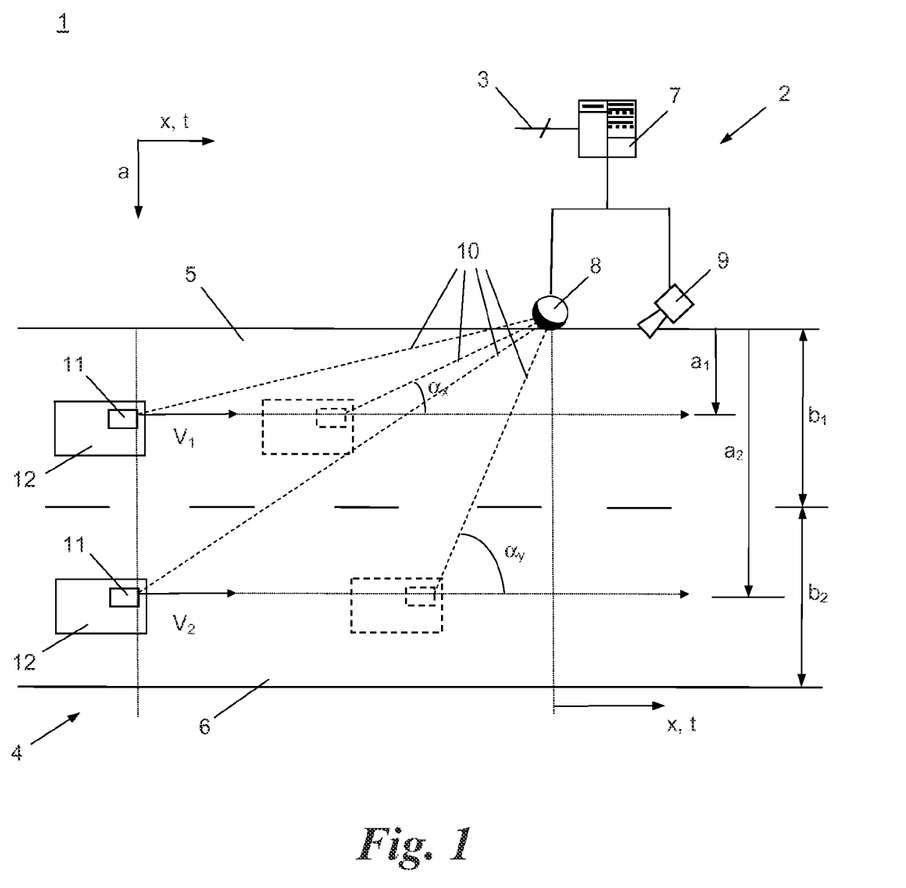
FIG. 1 is a schematic plan view of a radio beacon on a multi-lane road showing the geometric relationships during the passage of two vehicles, according to some embodiments of the present invention.

FIG. 1 shows a road toll system 1 comprising a plurality of geographically distributed radio beacons 2 (only one shown for representation), which connect with a central control unit (not shown) of the road toll system 1 via data connections 3. The radio beacons 2 are respectively installed on a road 4 that can comprise multiple carriageways or lanes 5, 6. For example, the radio beacon 2 includes a local computer 7, a (transmitter/) receiver 8 and a camera 9, which when operated by the computer 7, can record images of the road 4 with its lanes 5, 6 for penalising toll violations.

The (transmitter/) receiver 8 serves to conduct radio communications 10 with onboard units or OBUs 11 that are carried by vehicles 12 passing the radio beacon 2 in the road lanes 5, 6. The radio communications 10 are generally bidirectional data package connections. An analysis of the signals sent by the OBUs 11 to the (transmitter/) receiver 8 of the radio beacon 2 is sufficient in a first embodiment of the invention, and therefore only the OBU 11 sending signals 10 to the receiver 8 of the radio beacon 2 will be described in the following. Signals 10 in the opposite direction can also be analysed in embodiments explained below.

It is understood that the radio beacon 2 does not necessarily have to be fixed, but can also itself be carried by a vehicle, e.g. by a control vehicle 2', which in moving traffic passes vehicles 12 with OBUs 11 or is passed by these, see the embodiments of FIGS. 14 and 15 explained further below.

The vehicles 12 with the OBUs 11 move in lanes 5, 6 at different speeds $v_1$, $v_2$ past the radio beacon 2, more precisely the beacon's receiver 8, at different passing or normal distances $a_1$, $a_2$. In this case, the signals 10 emitted by the OBUs 11 are respectively subject to frequency-dependent Doppler shifts in accordance with the known formula $$f_D = \frac{f_s}{1-\frac{v}{c}} \quad (1)$$

where $f_s$—transmission frequency of the signal 10 of the OBU 11
$f_D$—Doppler-shifted receiving frequency of the signal 10 in the radio beacon 2 if the OBU 11 were to move towards it front on;
v—speed of the OBU 11; and
c—speed of light.

If the OBU 11 moves past the radio beacon 2 at a distance "a", equation (1) can be written by means of geometric deliberations as $$f_B \equiv \cos\left[\arctan\left(\frac{a}{x}\right)\right] f_D \quad (2)$$

where a—vertical distance of the OBU 11 from the radio beacon 2 in the coordinate system of FIG. 1;
x—horizontal distance of the OBU 11 from the radio beacon 2 in the coordinate system of FIG. 1; assuming a constant speed v or $v_2$ of the OBUs 11 the horizontal distance also simultaneously corresponds to time t; and
$f_B$—Doppler-shifted receiving frequency of the signal 10 in the radio beacon 2 when the OBU 11 is moving past it at the distance a.

Figure 2:
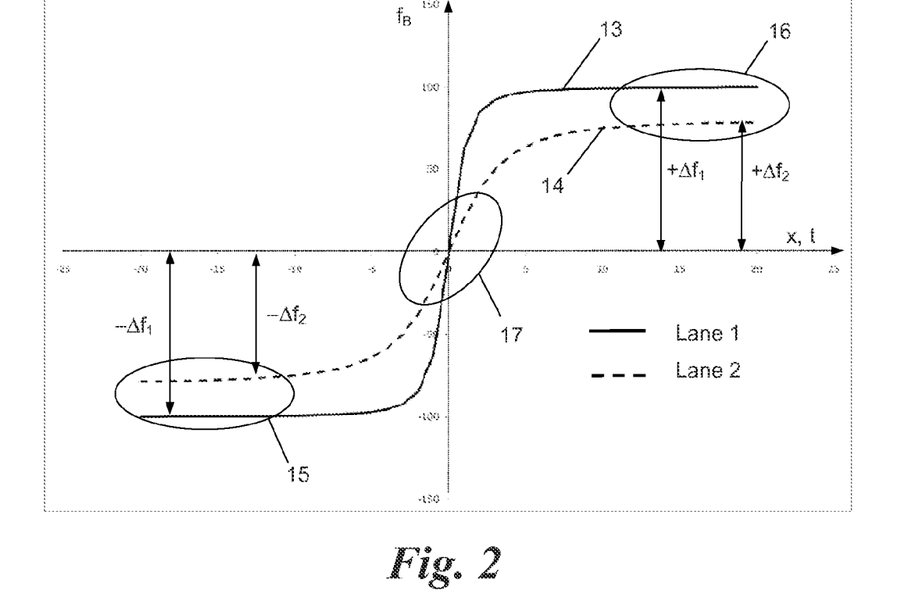
FIG. 2 shows frequency curves of the signals of two vehicles when passing the radio beacon, according to some embodiments of the present invention.

FIG. 2 shows two exemplary curves of the receiving frequency $f_B$ in relation to the horizontal distance x or the time t. The solid line 13 shows the receiving frequency curve for the OBU 11 in lane 5 and the broken line 14 shows that for the OBU 11 in lane 6. As can be seen, the Doppler-related frequency shift $\pm\Delta f_1$, $\pm\Delta f_2$ in "far regions" 15, 16 of the frequency curves 13, 14 far before and after a region 17 of maximum change $f_B'=\partial f_B/\partial t$ is small, i.e. the frequency change $f_B'$ lies below a significance threshold $\epsilon$ in the far regions 15, 16.

Therefore, in the far regions 15, 16 (and naturally also further outside these) the extent of the Doppler shift $\pm\Delta f$ is scarcely dependent on the passing distance a any longer and instead is almost exclusively dependent on the speed "v". The effect of the vehicle speed v on the frequency curves 13, 14 can therefore be eliminated by scaling these so that they respectively assume the same value in the far regions 15, 16, e.g. a predetermined value $\pm\Delta F$.

Figure 3:
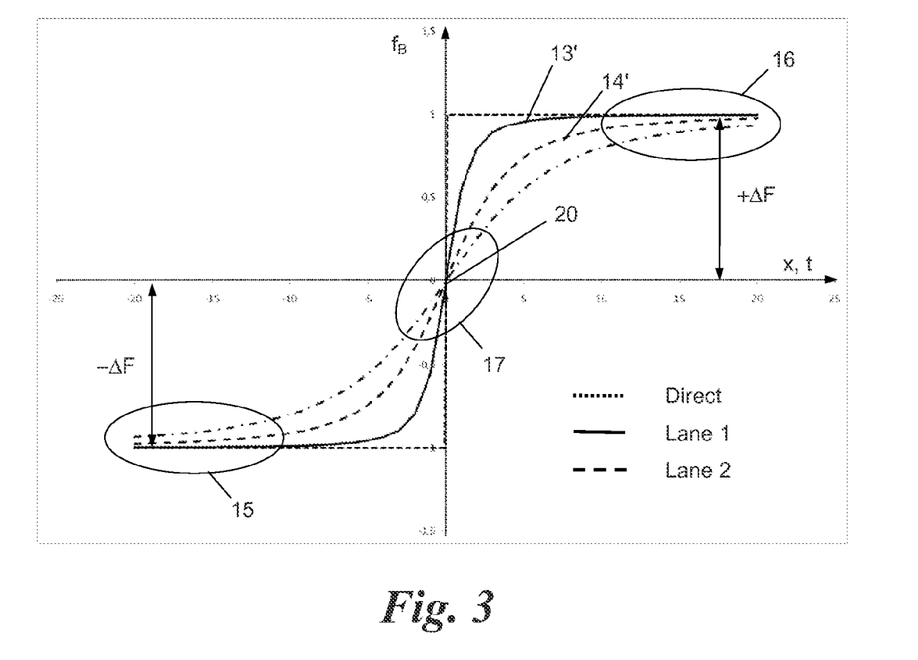
FIG. 3 shows the frequency curves of FIG. 2 after being scaled.

FIG. 3 shows the result of such scaling, in which the recorded frequency curves 13, 14 have been scaled ("normalised") so that they assume the predetermined values $\pm\Delta F$ in the far regions 15, 16.

The scaled frequency curves 13', 14' therefore are more dependent on the ratio a/x, i.e. the passing distance a to the horizontal distance x or to the time t, in accordance with the following $$f_B \equiv \cos\left[\arctan\left(\frac{a}{x}\right)\right] f_s \quad (3)$$

As can be seen from FIG. 3, the scaled frequency curves 13', 14' differ particularly, clearly in their gradient $f_B'=\partial f_B/\partial t$ at the location x=t=0, at which their curve at the same time shows an inflection point 20. The greater the passing distance "a", the more abraded the scaled frequency curve 13', 14', i.e. the tower the gradient $f_B'$ at the inflection point 20. Therefore, the passing distance a is inversely proportional to the gradient $f_B'$, i.e.

$$\frac{1}{a} \equiv \lim_{x \to 0} f_B'(x) \quad (4)$$

Figure 4:
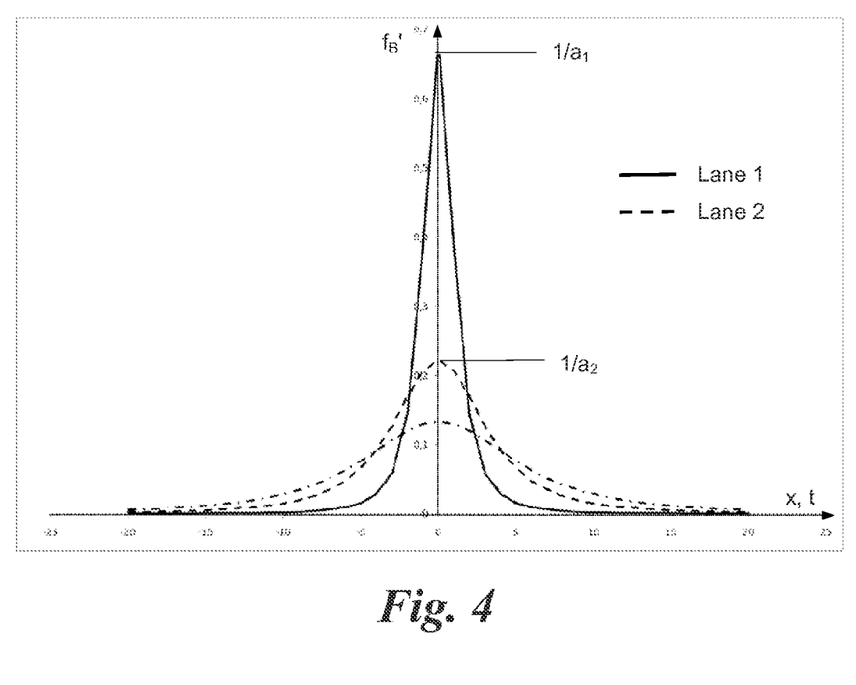
FIG. 4 shows the differentials of the scaled frequency curves of FIG. 3.

The gradient at the inflection point 20 can be determined by differentiating the scaled frequency curves 13', 14', and the result of the differentiation is shown in FIG. 4.

With knowledge of the lane width $b_1$, $b_2$ of lanes 5, 6, the respective lane 5, 6 in which the OBU 11 was located during the transmission of its signal 10 can be determined from the passing distances $a_1$, $a_2$ determined in this manner. A simple relative comparison of the passing distances $a_1$, $a_2$ is often also sufficient to determine the local sequence of the vehicles.

It has been assumed hitherto that the transmitting frequency $f_s$ of the signal 10 of the OBU 11 is constant, i.e. its own curve over time is a constant curve. However, it is also possible that the OBU 11 transmits a signal 10 with a transmitting frequency curve that is non-constant in time, e.g. in the case of frequency hopping radio communications, in which the transmitting frequency $f_s$ constantly changes—according to a predetermined or known pattern. The receiving frequency curves 13, 14 are recorded relative to the prior known curve of the transmitting frequency $f_s$ of the OBU 11 over time, whether it is constant or changing. That is, the receiving frequency curves are referenced or normalised to transmitting frequency of the OBU, so that the effect of known changes in transmitting frequency of the OBU 11 can be compensated.

Therefore, the method for determining the passing distance a of the OBUs 11 passing the radio beacon 2 is configured as follows.

The frequency curve 13, 14 of the signal 10 of the OBU 11 is plotted in relation to time t (=x), possibly based relatively on a prior known curve of the transmitting frequency $f_s$ over time. Then, the region 17 is approximately determined in the frequency curve 13, 14 at which a significant change indeed occurs, i.e. $\partial f_B/\partial t$ exceeds a predetermined detection threshold $\sigma$ ("first threshold"). This serves to obtain a time reference point for seeking the two far regions 15, 16 which must lie before and after the change 17 and be so far removed from this that no further significant frequency change $\partial f_B/\partial t$ occurs in these, i.e. this lies below a predetermined significance threshold $\epsilon$ ("second threshold").

With knowledge of the far regions 17, 18 and the Doppler shifts $\pm\Delta f_1$, $\pm\Delta f_2$ occurring therein (which can also be considered to be quasi-constant because their change does not exceed the significance threshold $\epsilon$), the frequency curves 13, 14 can be scaled so that they respectively assume the same predetermined value $\pm\Delta F$ in their far regions 15, 16.

The inflection point 20 is then determined in the scaled frequency curves 13', 14'. For this, the location x or the time t is determined in the frequency curves at which the receiving frequency $f_B$ assumes either the frequency mean value (the "middle") between the "quasi-constant" far regions 15, 16, or if the rated frequency of the signal 10 of the resting OBU 11 is known, assumes this rated frequency. The inflection point 20 can be determined in both ways, i.e. before the scaling in the frequency curves 13, 14, and after the scaling in the scaled frequency curves 13', 14'.

After determining the inflection point 20, the gradient $f_B'$ (x=t=0) of the scaled frequency curves 13', 14' in the inflection point 20 can be determined (see FIG. 4) and the passing distance "a" or $a_1$, $a_2$ can be determined therefrom, as explained above.

Figure 5:
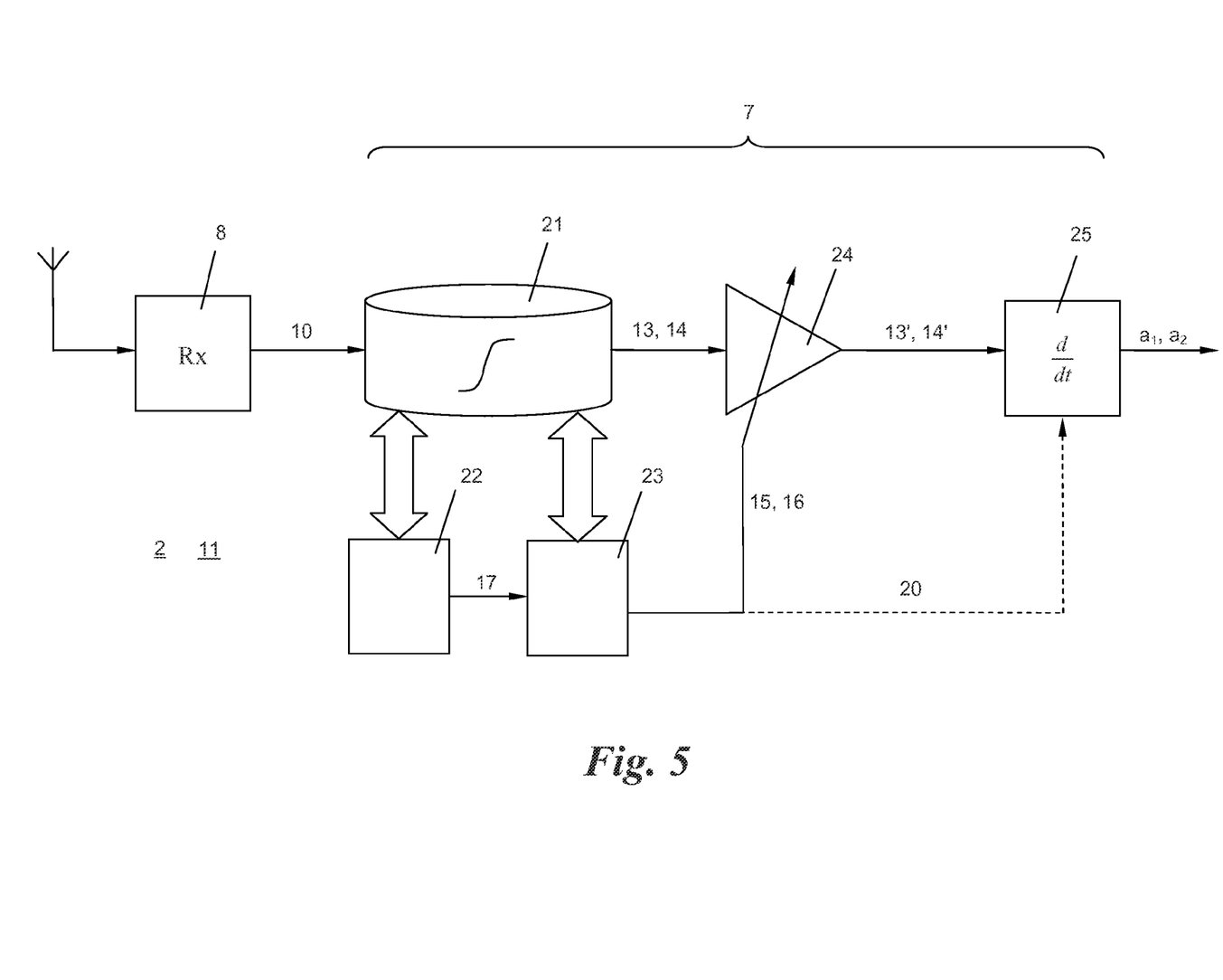
FIG. 5 is a block diagram of the radio beacon or the onboard unit according to the invention, according to some embodiments of the present invention.

FIG. 5 shows an exemplary hardware configuration of the radio beacon 2 for conducting the outlined method. Connecting to the receiver 8 the radio beacon 2 has a memory 21, in which the time frequency curves 13, 14 of the received signals 10 are recorded. A detector 22 connected to the memory 21 detects the change region 17 ($\partial f_B/\partial y > \sigma$) and feeds this information 17 to a first evaluation device 23. The first evaluation device 23 determines the far regions 15, 16 of the frequency curves 13, 14 with $\partial f_B/\partial t < \epsilon$ therefrom and with this information 15, 16 actuates a scaling device 24 that scales the frequency curves 13, 14 to scaled frequency curves 13', 14'. The latter are fed to a second evaluation device 25 in the form of a differentiator, which calculates the gradient $f_B'(0) = \partial f_B/\partial t$ at the location x=t=0 of its inflection point 20 in order to determine the passing distances $a_1$, $a_2$ therefrom.

The components 21-25 can be implemented, for example, by the local computer 8 of the radio beacon 2.

Figure 6:
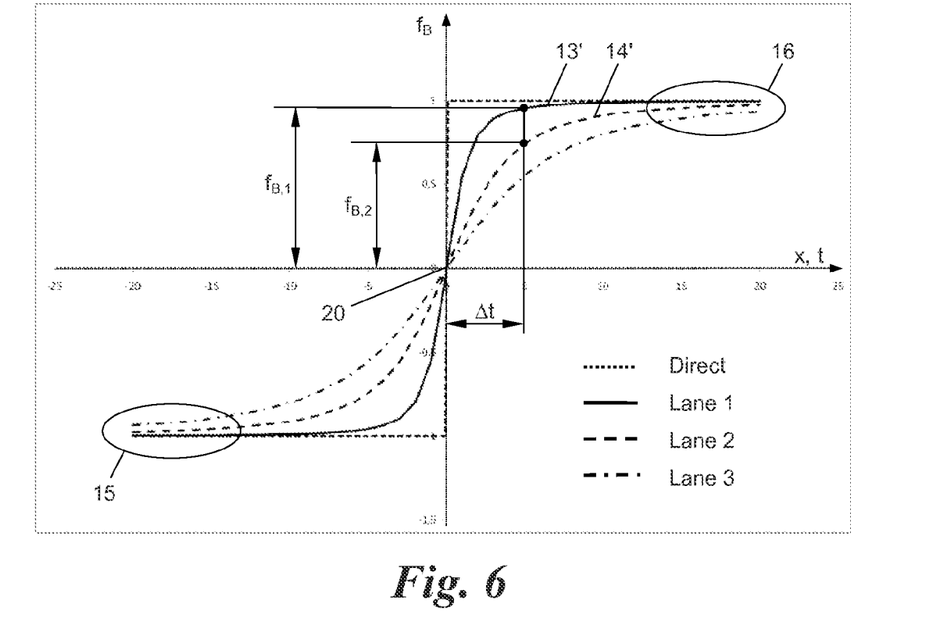
FIGS. 6 and 7 show alternative evaluation methods for the scaled frequency curves of FIG. 3.
Figure 7:
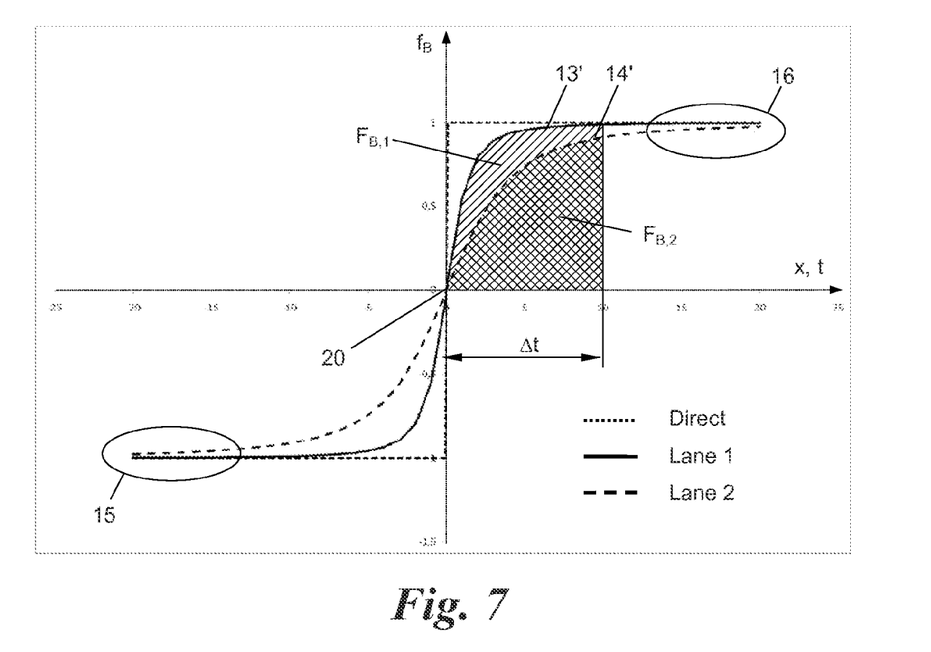

FIGS. 6 and 7 show some embodiments of the method outlined so far, which differ in the step of determining the passing distance a from the scaled frequency curve 13', 14', as explained above. While the evaluation of the gradient $f_B'$ of the scaled frequency curve 13', 14' in the inflection point 20 is a particularly significant criterion for the passing distance a, other signal-analysis parameters of the scaled frequency curve 13', 14' can also be evaluated.

FIG. 6 shows a first variant, in which the frequency values $f_{B,1}$ or $f_{B,2}$ of the scaled frequency curves 13', 14' are evaluated at a location $\Delta x = \Delta t$ lying between the inflection point 20 (x=t=0) and one of the far regions 15, 16, i.e. $f_{B,1}(\Delta t)$ or $f_{B,2}(\Delta t)$. The location $\Delta x = \Delta t$ can be selected, for example, half way between the inflection point 20 and one of the far regions 15 or 16.

Then the respective passing distance $a_1$, $a_2$ can be determined from the corresponding frequency value $f_{B,1}(\Delta t)$ or $f_{B,2}(\Delta t)$. The higher the frequency value $f_B$ at the predetermined location $\Delta t$, the smaller the passing distance "a". The frequency value $f_B$ of the scaled frequency curve 13', 14' relating to a specific passing distance a can be determined in test series and stored in a data bank or table, for example, which is then accessed during measurement in order to determine the respective passing distance a from a frequency value $f_B$.

Figure 8A:
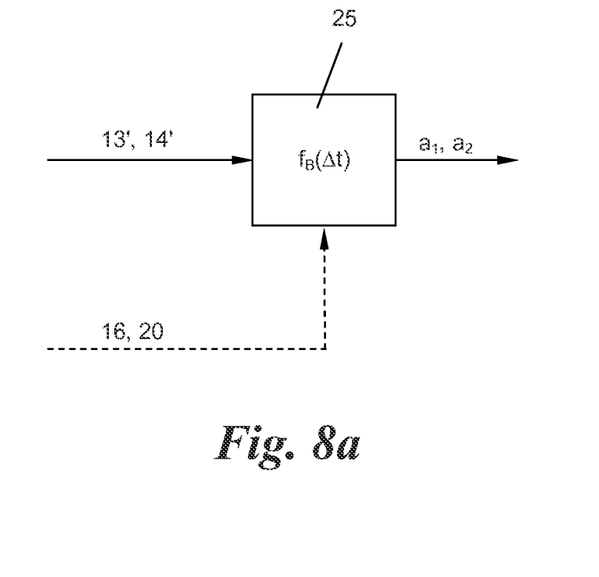
FIGS. 8a and 8b show variants of the second evaluation device of the radio beacon or the onboard unit of FIG. 5 for implementing the methods of FIGS. 6 and 7.

FIG. 8a shows a modified evaluation device 25 of the radio beacon 2 of FIG. 5. The modified evaluation device 25 is not configured as a differentiator here, but as a scanning element, which extracts the function value $f_B$ at the predetermined location $\Delta t$ of the scaled frequency curve 13', 14', wherein the location $\Delta t$ between the inflection point 20 and a far region, e.g. far region 16, is selected.

FIG. 7 shows a further techniques for evaluating the scaled frequency curves 13', 14' by calculating integrals thereof. The integrals of the scaled frequency curves 14' from the inflection point 20 to a predetermined location $\Delta x = \Delta t$ correspond to the areas $F_{B,1}$ for the scaled frequency curve 13' or $F_{B,2}$ for the scaled frequency curve 14' represented by hatching in FIG. 7. As can be seen, the integrals $f_B(\Delta t)$ are different depending on passing distance a. The smaller the passing distance a, the greater the integral or the area $F_B$. Once again, by means of test series for different passing distances a the respectively occurring areas or integrals $F_B$ can be determined and pre-stored in a table or data bank on that the respectively associated passing distance a can be determined later in the measurement operation from a measured integral value $F_B$.

In this case, the integration limits of the integrals $F_B$ can be respectively selected from the inflection point 20 (x=t=0) up to a point $\Delta x = \Delta t$ between the inflection point 20 and one of the far regions 15, 16, or also from the inflection point 20 up to a far region 15, 16. Instead of the inflection point 20 a point spaced therefrom and lying in front of one of the far regions 15, 16 can be selected as lower integration limit.

Figure 8B:
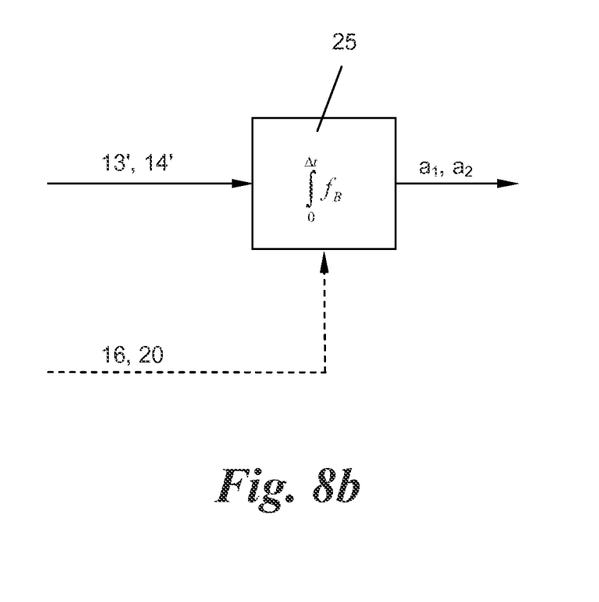

FIG. 8b shows an exemplary configuration of a second evaluation device 25 for radio beacon 2 of FIG. 5, which is formed by an integrator. The integrator conducts the integration of the scaled frequency regions 13', 14' between the said integration limits, e.g. the inflection point 20 and a far region 16, to determine the respective passing distance $a_1$, $a_2$ therefrom, e.g. on the basis of a data bank table.

In some embodiments of the invention, the entire method described so far for determining the distance "a" can also be performed in the OBU 11, i.e. on the basis of an evaluation of signals 10 that the OBU receives from the radio beacon 2. Accordingly, FIGS. 5 and 8 at the same time show an exemplary hardware configuration of an OBU 11 for conducting this method variant, and the components 7, 8, 21-25 are accordingly internal components of an OBU 11.

It is also possible that both the radio beacon 2 and the OBU 11 determine the distance from the respective other component 11 or 2 according to the outlined method. The receivers 8 of the beacon 2 and OBU 11 can then be configured as transceivers and the radio beacon 2 can optionally transmit to the OBU 11 the distance "a" it has determined and/or the OBU 11 can optionally transmit to the radio beacon 2 the distance a it has determined for cross-checking with the distance a respectively determined there.

In the same way, radio beacon 2 and OBU 11 can also exchange or impart specific information that is based on the determined distance a and relates to the respective road lane 5, 6, in which the vehicle 12 with the OBU 11 is located. The information relating to the road lane 5, 6 is useful, for example, if a road lane-dependent toll is to be charged or an unauthorised use of a road lane is to be penalised: so-called "HOT lanes" (high-occupancy toll lanes) are reserved, for example, for vehicles with a specific minimum number of occupants (so-called high-occupancy vehicles, HOVs), but can also be used by vehicles with fewer occupants on payment e.g. of an occupant number-dependent toll (HOT charge). If the OBU 11 itself determines the road lane 5, 6 as basis for calculation of a HOT charge and communicates this to the radio beacon 2, this can check the correct calculation of the HOT charge by means of its own distance measurement.

Figure 9:
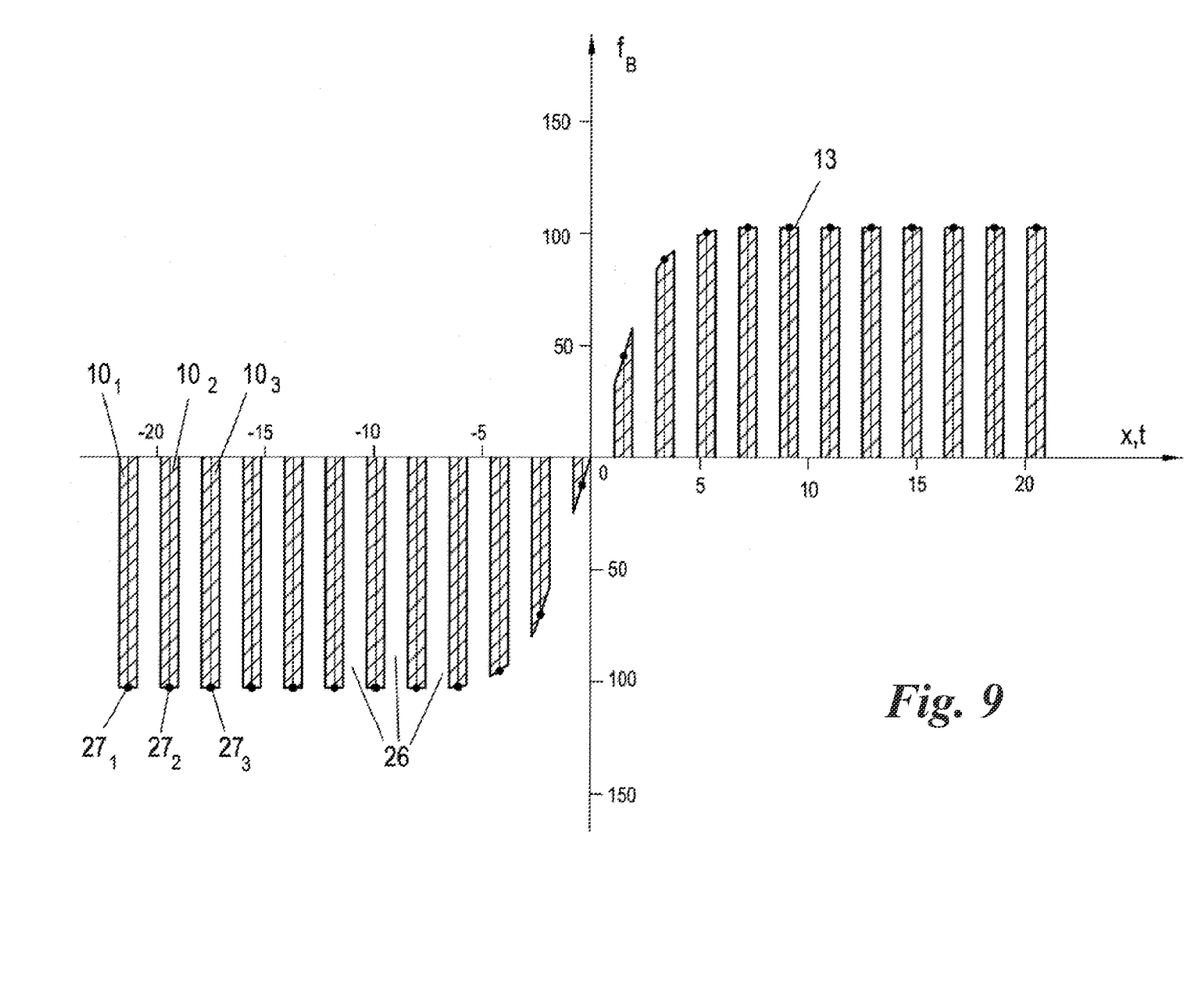
FIG. 9 shows a variant of the invention based on intermittently emitted signals and correspondingly intermittent frequency curves, according to some embodiments of the present invention.

FIG. 9 shows a further variant of the outlined methods, radio beacons and OBUs, which the signal 10 is not present continuously or constantly during the entire time span of the passage of interest here, but intermittently, i.e. interrupted by gaps 26—because of a division of the radio communication into data packets $10_1$, $10_2$, $10_3$ etc., in general $10_j$. The receiving frequency $f_B$ of the signal 10 in the respective receiving communication partner, whether radio beacon 2 or OBU 11, can thus only by recorded at discrete times, so that the frequency curves 13, 14 are quantised in a time-discrete manner (temporally scanned) into scan values $27_1$, $27_2$, $27_3$ etc., in general $27_i$.

it is understood Eat the differential $f_B'$ of such a discrete sequence of scan values $27_i$ can be determined very simply by computation techniques from the gradients of the connecting lines between two respective consecutive scan values, as is known in the art, and consequently the gradient $f_B'$ in the inflection point 20 corresponds approximately to the gradient between the two scan values 27' enclosing the inflection point 20, which also simplifies the structure of the differentiator 25 accordingly.

The "uninterrupted" embodiment of FIGS. 1 to 4 (when implemented with a conventionally clocked processor system, e.g. according to FIGS. 5 and 8) also represents a time-discrete system with a scanning rate corresponding to the scanning rates of the analog/digital converters used and clock rates of the processors used. This means merely a reduction in accuracy to the extent of a scanning rate reduced to the time points 27; compared to the above-mentioned embodiments. If the time points $27_i$ are set correspondingly closely, a correspondingly high scanning rate results for the frequency curves 13, 14 quantised in a time-discrete manner that only causes a slight reduction in accuracy in the determination of the distance "a".

The intermittent signals 10 of the embodiment of FIG. 9 can be formed, for example, by a sequence of data packets $10_i$, which are exchanged between the radio beacon 2 and the OBU 11 according to the CEN-DSRC or WAVE or ITS-G5 standard. According to the CEN-DSRC standard, for example, a radio beacon 2 periodically transmits so-called Beacon Service Table messages (BST) to prompt the OBUs 11 entering its radio coverage area to respond. In a similar manner, according to the WAVE or ITS-G5 standard a radio beacon 2 can repeatedly transmit so-called WAVE Service Announcement messages (WSA), which can be picked up by passing OBUs 11. Each BST or WSA message of the radio beacon 2 then forms a data packet $10_i$ of a sequence, which can be evaluated as a signal 10 by the OBU 11 in the described manner.

Conversely, a radio beacon 2 can evaluate repeated data transmissions of an OBU 11 as a signal 10. Since according to the CEN-DSRC and WAVE or ITS-G5 standard OBUs 11 generally only respond upon prompting by a radio beacon 2, the radio beacon 2 transmits a periodically repeated request signal for this that respectively prompts a response of an OBU 11, e.g. a periodic sequence of BST or WSA messages or of so-called "echo" messages, which are repeated by an OBU 11. In this way, OBUs 11 can be caused to repeatedly transmit data packets $10_i$, which can be evaluated in the radio beacon 2 in the outlined manner in order to determine the distance "a".

In an exemplary embodiment with a radio beacon 2, the radio coverage area of which, viewed in the running direction of the road 4, extends approximately 20 m in front of and 20 m behind the beacon, i.e. is approximately 40 m long, and with a time interval of the data packets $10_i$ of approximately 10 ms corresponding to a data packet transmission rate of approximately 100 Hz an OBU 11 at a travelling speed of 10 km/h is located in the radio coverage area of the radio beacon 2 for approximately 13 seconds, on that 1300 data packets $10_i$ are transmitted and thus 1300 scan values $27_i$ of the frequency curves 13, 14 can be created. Approximately 100 scan values $27_i$ can still be created at a travelling speed of approximately 130 km/h, which provides an adequate time resolution of the frequency curves 13, 14 and thus an adequate accuracy of the determination of the distance a.

If both the radio beacon 2 and the OBU 11 each determine the distance a and the OBU 11 transmits the distance "a" it has determined to the radio beacon 2 for cross-checking, different scanning rates for the frequency curves 13, 14 can also be provided in the beacon 2, on the one hand, and the OBU on the other. In particular, a reduced scanning rate can be provided on the part of the beacon 2 because this is sufficient for validation of the distance a communicated by the OBU 11.

A further possibility is to adaptively match the repetition rate $f_A$ of the data packets 10' to the distance $$e=\sqrt{a^2+x^2}$$

between the radio beacon 2 and OBU 11, i.e. such that the repetition rate is increased as distance e decreases and is decreased as distance e increases, i.e.

$$f_A \equiv \frac{1}{e}.$$

As a result, a higher time resolution or scanning rate of the scan values $27_i$ can be achieved in the vicinity of the Doppler jump of interest, which benefits the accuracy of the determination of the inflection point 20 and the gradient $f_B'$ in the inflection point 20 and thus the distance "a".

The distance "e" can be determined either by means of a separate distance measurement sensor in the radio beacon 2 or the OBU 11, or approximately from a measured value the received signal strength indication (RSSI) of the signal 10 in the transceiver 8 of the radio beacon 2 or the OBU 11 itself, i.e.

$$f_A = \text{RSSI}$$

When using BST, WSA or echo messages of the radio beacon 2, whether as data packets 10' of the radio beacon 2 for evaluation of the OBU 11 or for triggering corresponding response data packets 10' of the OBU 11 for evaluation in the radio beacon 2, the repetition rate $f_A$ can be varied in both variants as a function of the received signal strength RSSI of the respective response data packets of the OBU 11.

FIGS. 10 to 13 and 15 show different variants of an assembly 28 for determining the road lane 5, 6, 6' of a multi-lane road 4 used by vehicles 112, which assembly comprising multiple radio beacons 2 of the specified type. The radio beacons 2 can respectively have their own local computers 7 or a joint local computer 7 and connect to one another via a corresponding local data network (not shown) and to the control centre (not shown) of the road toll system 1, via the data connection 3.

Figure 12:
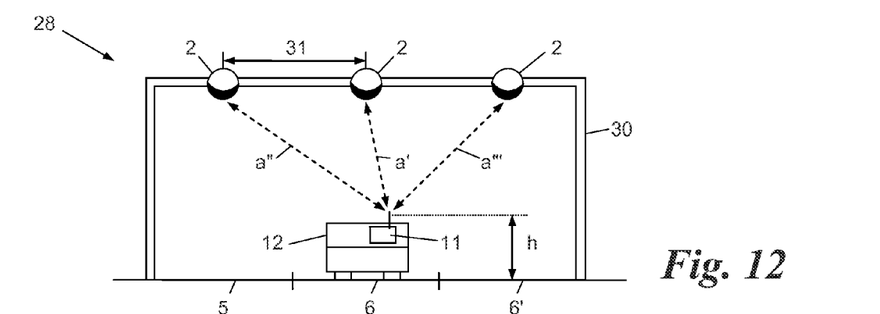
Figure 13:
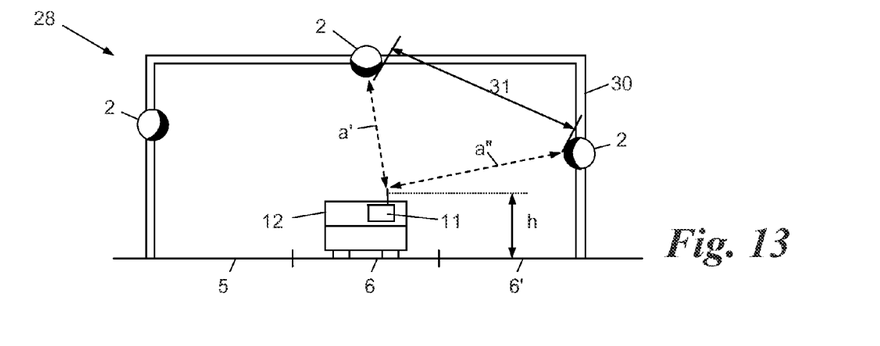
Figure 15:
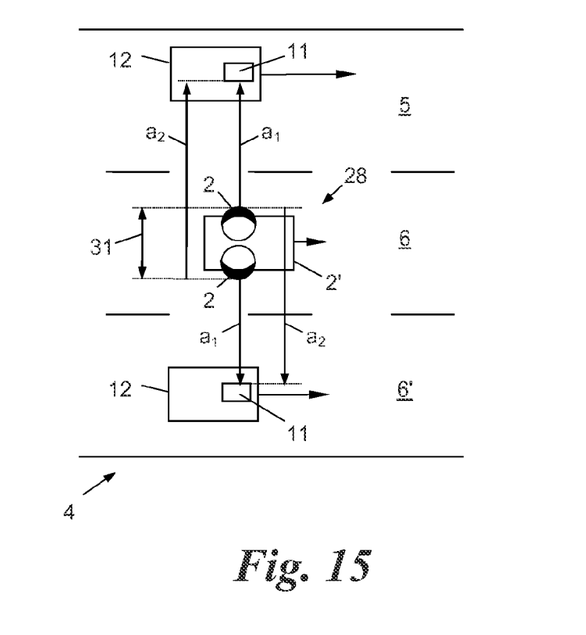
FIG. 15 shows an assembly with two radio beacons according to the invention mounted on a control vehicle.

The radio beacons 2 of the assembly 28 are all located approximately in the same normal plane 29 to the road longitudinal direction x and can be installed at approximately the same height above the road 4 (FIGS. 10, 11, 12, 15) or at different heights (FIGS. 13, 15). That is, the beacons can be installed both laterally on both sides of the road 4 (FIG. 10), adjacent to or between the road lanes 5, 6, 6' (FIG. 11), above the road 4 on a bridge girder 30 spanning the road 4 (FIG. 12), in a combination of the types of installation both laterally of and above the road 4 (FIG. 13), or laterally on a mobile vehicle 2' (FIG. 15). Each of the radio beacons 2 determines its respective distance a', a", a''' from a passing OBU 11 in the normal plane 29. Thus determined distances a', a" and a'" can be evaluated in different ways, depending on the arrangement of the radio beacons:

In the embodiments of FIGS. 10, 11, 12 and 15, in which the radio beacons 2 are located at approximately the same height relative to the road 4, the respective road lane 5, 6, 6' can be determined directly by way of the radio beacon 2 that measures the smallest distance a', a", a'", if each radio beacon 2 has an associated road lane 5, 6, 6'.

Figure 10:
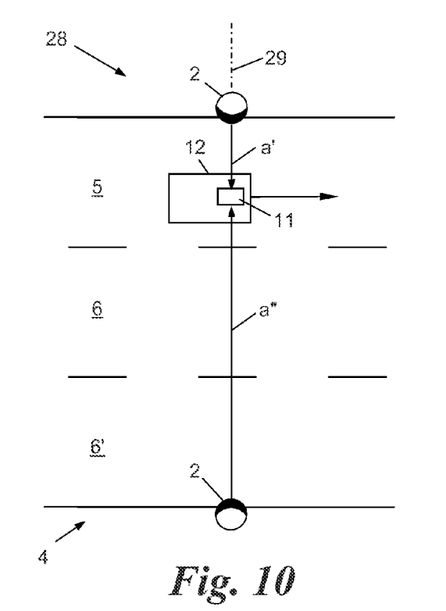
FIGS. 10 to 13 show different embodiments of assemblies according to the invention for road lane determination on multi-lane roads using multiple radio beacons of the invention both in plan view (FIGS. 10 and 11) and in a side view viewed in road direction (FIGS. 12 and 13).
Figure 11:
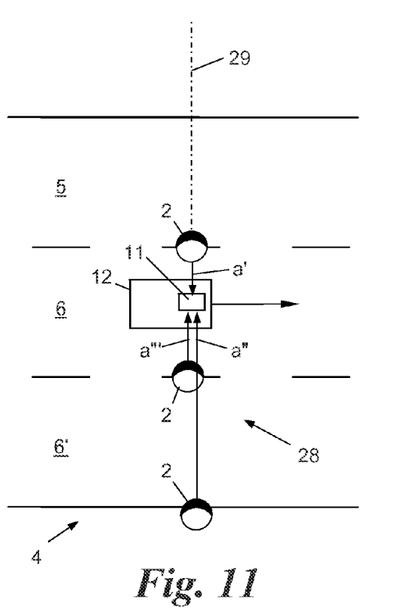

The majority of radio beacons 2 of the assembly 28 can also be used to increase the accuracy of the distance determination in that from the multiple radio beacons and the distances a', a", a'" determined by them. For example, the distance that is the smallest, e.g. distance a' in FIGS. 10, 11 and 2, is used for the further evaluation. This makes use of the effect that resolving the above equations (1)-(4) in a decimal fixed point computer 7 leads to a more accurate result when the gradient $f_B'$ is not too flat, while the distance does not go below a minimum distance "a" because of the installation location of the beacon 2. That is, the gradient $f_B'$ is not too severe that it could be no longer be resolved in a time-discrete system with a sufficient number of distance values $27_i$.

In some embodiments, the multiplicity of radio beacons 2 of the assembly 28 can be used to calculate the transverse distance "a" and optionally also the height "h" of the OBU 11 above the road 4 by means of trigonometric triangulation, with knowledge of the installation locations of the radio beacons 2 and their distances 31 from one another (FIGS. 12, 13, 15).

All the evaluations of the multiplicity of radio beacons 2 can be conducted, for example, in one or more of the computers 7 ("third evaluation device").

Figure 14:
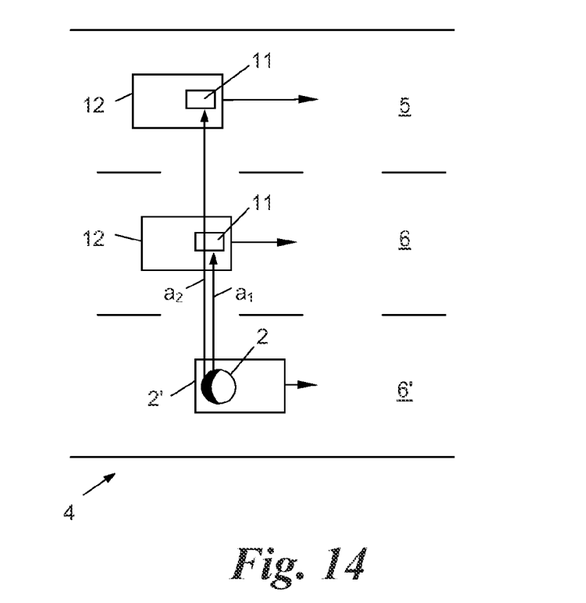
FIG. 14 shows a radio beacon according to the invention mounted on a control vehicle, according to some embodiments of the present invention.

FIG. 14 shows the use of a radio beacon 2 on a mobile control vehicle 2' of the road toll system 1 and FIG. 15 shows the use of two radio beacons 2 in the manner of an assembly 28. Thus, the vehicles 12 passing the control vehicle 2' in different road lanes 5, 6, 6' can be distinguished from one another on the basis of their different passing distances $a_1$, $a_2$. If according to FIG. 15, at least two radio beacons 2 are installed on the control vehicle 2' with a distance 31 between them, e.g. on both sides of the control vehicle 2', it can also be determined on the basis of the passing distances $a_1$, $a_2$ measured by the individual radio beacons 2, whether a passing vehicle 12 is travelling past the control vehicle 2' on the left or right.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for determining a distance between a radio beacon and an onboard unit passing the radio beacon in a road toll system, wherein at least one of the radio beacon and the onboard unit emits a signal with a known curve of its frequency over time, the method comprising:
receiving the signal by the other of the radio beacon and the onboard unit during the passing and recording the curve of the frequency of the received signal over time;
detecting a change in the recorded frequency curve exceeding a first threshold value;
determining two far regions in the recorded frequency curve lying before and after the detected change in time that show a frequency change below a second threshold value;
scaling the recorded frequency curve in such a manner that the far regions assume predetermined values; and
determining said distance from the scaled frequency curve.

2. The method according to claim 1, wherein said distance is determined from a gradient of the scaled frequency curve in an inflection point thereof.

3. The method according to claim 1, wherein said distance is determined from a frequency value of the scaled frequency curve lying between an inflection point of the scaled frequency curve and a far region.

4. The method according to claim 1, wherein said distance is determined from an integral of the scaled frequency curve over a section lying between an inflection point thereof and a far region.

5. The method according to claim 1, wherein the signal is emitted by the radio beacon and received by the onboard unit, and wherein said recording, detecting, seeking, scaling and determining are performed by the onboard unit.

6. The method according to claim 5, wherein the signal is emitted intermittently and the recorded frequency curve is processed in a time-discrete manner for time points at which the signal is received.

7. The method according to claim 6, wherein the signal is formed by a repeated request signal of the radio beacon, which prompts passing onboard units to respond.

8. The method according to claim 7, wherein a repetition rate of the request signal is adaptively matched to an approximate measured value of the distance between the radio beacon and the onboard unit.

9. The method according to claim 8, wherein the repetition rate is adaptively matched to a received signal strength of a response signal of the onboard unit received in the radio beacon.

10. The method according to claim 8, wherein the repetition rate is adaptively matched to a received signal strength of the signal received in the radio beacon.

11. The method according to claim 1, wherein the signal is emitted by the onboard unit and received by the radio beacon, wherein said recording, detecting, seeking, scaling and determining are performed by the radio beacon.

12. The method according to claim 11, wherein the signal is emitted intermittently and the recorded frequency curve is processed in a time-discrete manner for time points, at which the signal is received.

13. The method according to claim 12, wherein the signal is formed by a sequence of response signals of the onboard unit, which are respectively passed to the radio beacon as response to a repeated request signal.

14. The method according to claim 13, wherein a repetition rate of the request signal is adaptively matched to an approximate measured value of the distance between the radio beacon and the onboard unit.

15. The method according to claim 1, wherein at least one of the radio beacon and the onboard unit, transmits the distance it has determined, to the other of the radio beacon and the onboard unit to compare the received distance with the distance it has itself determined.

16. The method according to claim 1, wherein a road lane of a multi-lane road, in which a vehicle that is equipped with the onboard unit is moving on, is determined from the distance.

17. The method according to claim 16, wherein the determination of the road lane occurs in the onboard unit and information concerning the determined road lane is transmitted from the onboard unit to the radio beacon, and wherein the radio beacon cross-checks the road lane information against a distance it has itself determined.

18. The method according to claim 1, wherein the curve of the frequency of the received signal is normalised to the known curve before detecting said change in the recorded frequency curve.

19. A radio beacon for a road toll system for determining a distance of a vehicle passing the radio beacon, wherein the vehicle is equipped with an onboard unit, which emits a signal with a known curve of its frequency over time comprising:
    a receiver configured to receive the signal from the passing vehicle;
    a memory connected to the receiver, which is configured to record a curve of the frequency of the received signal over time;
    a detector electrically coupled to the memory and configured to detect a change in the recorded frequency curve;
    a first evaluation device electrically coupled to the detector and the memory and configured to determine two far regions in the recorded frequency curve lying before and after the detected change in time that show a frequency change below a threshold value;
    a scaling device electrically coupled to the memory and the first evaluation device and configured to scale the recorded frequency curve in such a manner that the far regions assume predetermined values; and
    a second evaluation device electrically coupled to the scaling device and configured to determine the distance from the scaled frequency curve.

20. The radio beacon according to claim 19, wherein the second evaluation device is configured to determine said distance from the frequency change of the scaled frequency curve in an inflection point thereof.

21. The radio beacon according to claim 19, wherein the second evaluation device is configured to determine said distance from a frequency value of the scaled frequency curve lying between an inflection point of the scaled frequency curve and the far region.

22. The radio beacon according to claim 19, wherein the second evaluation device is configured to determine said distance from an integral of the scaled frequency curve over a section lying between an inflection point thereof and the far region.

23. The radio beacon according to claim 19, further comprising a transmitter for repeated emission of a request to prompt passing onboard units to each emit a response signal, wherein the response signals from the passing onboard units intermittently form the signal, wherein the radio beacon processes the recorded frequency curve in a time-discrete manner for time points, at which the signal is received.

24. The radio beacon according to claim 23, wherein a repetition rate of the request signal is adaptively matched to an approximate measured value of the distance between the radio beacon and the onboard unit.

25. The radio beacon according to claim 24, wherein the repetition rate is adaptively matched to a received signal strength of the signal received in the radio beacon.

26. The radio beacon according to claim 23, wherein the transmitter is a European Committee for Standardization dedicated short-range communication (CEN-DSRC), wireless access in a vehicle environment (WAVE) or intelligent transport systems generation 5 (ITS-G5) transceiver and the request signal is a Beacon Service Table or WAVE Service Announcement message.

27. The radio beacon according to claim 19, wherein the radio beacon is installed on a multi-lane road and the second evaluation device is further configured to determine the road lane, in which the vehicle is moving, from the determined distance.

28. The radio beacon according to claim 19, wherein the radio beacon is mounted on a control vehicle of the road toll system.

29. An assembly for determining a road lane, on which a passing vehicle with an onboard unit is moving comprising:
    at least two radio beacons according to claim 19, which lie in a normal plane to the road longitudinal direction approximately at the same level at a distance from one another and respectively determine their distance from the onboard unit, and
    a third evaluation device electrically coupled to the radio beacons for receiving said determined distances, selecting the shortest distance from said determined distances and determining the road lane therefrom.

30. The assembly according to claim 29, wherein the two radio beacons are mounted on one side of the control vehicle.

31. An assembly for determining the road lane of a passing vehicle with an onboard unit on multi-lane road, comprising:
    at least two radio beacons according to claim 19, which lie in a normal plane to the road longitudinal direction at a distance from one another and respectively determine their distance from the onboard unit, and
    a third evaluation device electrically coupled to the radio beacons for receiving said determined distances and determining the road lane by triangulation from the position of the radio beacons, their distance from one another and the determined distances.

32. The radio beacon according to claim 19, wherein the memory is configured to record the curve of the frequency of the received signal over time normalised to the known curve.

33. An onboard unit for a road toll system for determining the distance from a radio beacon of the road toll system, wherein the radio beacon emits a signal with a known curve of its frequency over time comprising:
    a receiver configured to receive the signal from the radio beacon;
    a memory electrically coupled to the receiver configured to record the curve of the frequency of the received signal over time;
    a detector electrically coupled to the memory and configured to detect a change in the recorded frequency curve;
    a first evaluation device electrically coupled to the detector and the memory and configured to determine two far regions in the recorded frequency curve lying before and after the detected change in time that show a frequency change below a threshold value;
    a scaling device electrically coupled to the memory and the first evaluation device and configured to scale the recorded frequency curve in such a manner that the far regions assume predetermined values; and
    a second evaluation device electrically coupled to the scaling device, configured to determine the distance from the scaled frequency curve.

34. The onboard unit according to claim 33, wherein the second evaluation device is configured to determine said distance from the frequency change of the scaled frequency curve in an inflection point thereof.

35. The onboard unit according to claim 33, wherein the second evaluation device is configured to determine said distance from a frequency value of the scaled frequency curve lying between an inflection point of the scaled frequency curve and a far region.

36. The onboard unit according to claim 33, wherein the second evaluation device is configured to determine said distance from an integral of the scaled frequency curve over a section lying between an inflection point thereof and a far region.

37. The onboard unit according to claim 33, wherein the recorded frequency curve is processed in a time-discrete manner for time points at which the signal is received.

38. The onboard unit according to claim 33, wherein the second evaluation device is configured to determine the road lane in which the onboard unit is located, from the distance.

39. The onboard unit according to claim 38, further comprising a transmitter configured to transmit information concerning the specific road lane to the radio beacon.

40. The onboard unit according to claim 33, wherein the memory is configured to record the curve of the frequency of the received signal over time normalised to the known curve.

* * * * *